(12) United States Patent
Kugelmass et al.

(10) Patent No.: US 12,548,684 B2
(45) Date of Patent: Feb. 10, 2026

(54) CONTAINMENT FOR A NUCLEAR REACTOR

(71) Applicant: Last Energy Inc., Washington, DC (US)

(72) Inventors: Bret Kugelmass, Washington, DC (US); Mark Blomstrom, Northbridge, MA (US); Phoebe E Lind, Washington, DC (US); Charles Cole, Washington, DC (US); Daniel Wesley Theobald, Manchester (GB); Christopher Buss, Washington, DC (US)

(73) Assignee: Energy Inc., Washington, DC (US)

( * ) Notice: Subject to any disclaimer, the term of this patent is extended or adjusted under 35 U.S.C. 154(b) by 0 days.

(21) Appl. No.: 18/948,199

(22) Filed: Nov. 14, 2024

(65) Prior Publication Data

US 2025/0157680 A1    May 15, 2025

Related U.S. Application Data

(60) Provisional application No. 63/598,642, filed on Nov. 14, 2023.

(51) Int. Cl.
*G21C 13/087* (2006.01)
*G21C 13/024* (2006.01)
(Continued)

(52) U.S. Cl.
CPC ....... *G21C 13/0875* (2013.01); *G21C 13/024* (2013.01); *F28D 20/0056* (2013.01); *G21C 13/028* (2013.01); *G21C 13/087* (2013.01)

(58) Field of Classification Search
CPC  G21C 13/0875; G21C 13/024; G21C 13/087; G21C 13/028; F28D 20/0056
(Continued)

(56) References Cited

U.S. PATENT DOCUMENTS 3,963,563 A * 6/1976 Beine ................ G21C 13/00
376/287
3,974,027 A * 8/1976 Michel ............... G21C 13/00
376/289

(Continued)

OTHER PUBLICATIONS

Konno, "Construction materials for reactor buildings for decommissioning and recycling", Nuclear engineering and design 192, No. 2-3 (1999): 365-380. (Year: 1999).*

*Primary Examiner* — Jack W Keith
*Assistant Examiner* — Daniel Wasil

(57) ABSTRACT

A system for containing a nuclear reactor is disclosed. The system includes a nuclear containment structure comprising a plurality of metallic rings stacked axially to form the nuclear containment structure. The nuclear containment structure includes a central chamber that comprises a volume enclosed by the inner wall of each of the plurality of metallic rings, and also includes a plurality of auxiliary chambers. The central chamber encloses a nuclear reactor vessel, wherein the inner wall of the plurality of metallic rings is flush with the nuclear reactor vessel. Cooling channels also exist within the nuclear containment structure. The nuclear containment structure is configured to shield the nuclear reactor vessel from kinetic events originating external from the nuclear containment structure and to shield an external environment from kinetic events within the nuclear reactor vessel.

19 Claims, 9 Drawing Sheets

(51) Int. Cl.
*F28D 20/00* (2006.01)
*G21C 13/028* (2006.01)

(58) Field of Classification Search
USPC .......................................... 376/288, 292, 293
See application file for complete search history.

(56) References Cited

U.S. PATENT DOCUMENTS

| | | | | |
|---|---|---|---|---|
| 3,985,614 | A * | 10/1976 | Jungmann | G21C 11/02 376/293 |
| 4,751,043 | A * | 6/1988 | Freeman | G21C 11/06 376/458 |
| 5,211,906 | A * | 5/1993 | Hatamiya | G21C 13/00 376/293 |
| 2005/0286674 | A1 | 12/2005 | Fischer et al. | |
| 2010/0177859 | A1 * | 7/2010 | Yokoyama | G21C 13/02 376/294 |
| 2023/0167025 | A1 * | 6/2023 | Ferraro | G21F 1/042 106/815 |
| 2023/0197301 | A1 * | 6/2023 | Pouvreau | G21C 13/024 376/282 |
| 2023/0274846 | A1 * | 8/2023 | Knight | G21C 13/02 376/280 |
| 2025/0087377 | A1 * | 3/2025 | Miller | G21C 15/12 |
| 2025/0132064 | A1 * | 4/2025 | Kugelmass | G21C 13/0875 |

\* cited by examiner

CONTAINMENT FOR A NUCLEAR REACTOR

CROSS REFERENCE TO RELATED APPLICATIONS

This application claims the benefit of priority of U.S. Provisional Application No. 63/598,642, filed Nov. 14, 2023. The foregoing application is incorporated herein by reference in its entirety.

TECHNICAL FIELD

The present disclosure relates to systems, methods, and structures for containing a nuclear reaction. In particular, embodiments of the present disclosure relate to simplified design and streamlined construction of nuclear containment structures.

BACKGROUND

A containment structure is a gas-tight shell or other enclosure around a nuclear reactor to confine fission products that otherwise might be released to the atmosphere in the event of an accident. Typically, such enclosures are massive dome-shaped structures, or buildings, made of steel-reinforced concrete. A typical containment structure may enclose the reactor vessel and coolant systems, including, in a pressurized water reactor, the steam generators and pressurizer. In some applications, the entire reactor building may be formed by one contiguous pour of concrete, which serves, in part or in whole, as the containment structure.

Over the past decades, costs of constructing nuclear reactors, particularly for nuclear power plants, has skyrocketed. Additionally, timetables for completing construction of nuclear reactors and related containment structures have stretched to unreasonable levels. Simultaneously, global awareness of the need to decarbonize industrial processes traditionally reliant on the burning of fossil fuels, such as electricity generation, has reached unprecedented levels. While nuclear energy has the potential to provide safe, resilient, and carbon-free baseload energy, extreme capital costs associated with traditional nuclear energy systems have dampened efforts to expand the use of nuclear energy.

Accordingly, it would be advantageous to simplify the design and streamline construction of nuclear containment structures. These and other benefits will become apparent to a person of ordinary skill in the art from the following description and figures.

SUMMARY

Embodiments consistent with the present disclosure provide systems, methods, and structures generally related to nuclear containment.

Consistent with disclosed embodiments, a nuclear system containment structure is disclosed. For example, disclosed embodiments include a nuclear containment structure, wherein a plurality of metallic rings may be stacked axially to form the nuclear containment structure, the nuclear containment structure being configured to: mitigate, by using a physical barrier, the movement of radionuclides from inside a containment structure to a surrounding space; shield, by varying the alloy properties throughout the containment structure, an exterior of the containment structure from radiation produced inside of the containment structure; regulate, by transferring thermal energy, a temperature within the containment structure, wherein the containment structure transmits heat from an inside wall of the containment structure to an external wall of the containment structure; and regulate, by storing thermal energy, the temperature within the containment structure, wherein the containment structure absorbs heat produced inside the containment structure, wherein the containment structure comprises one or more materials having different phase change temperatures, one or more of the materials being configured to undergo a phase change to absorb heat.

Disclosed embodiments of the invention further include enclosing, within a cavity in a vessel, a nuclear reactor, wherein the vessel provides structure for the nuclear reactor; enclosing, within a first plurality of chambers formed in the vessel, a plurality of auxiliary components or cooling channels associated with the nuclear reactor, wherein the vessel is configured to provide support for the plurality of auxiliary components or cooling channels; shielding, from kinetic events outside of the vessel, the nuclear reactor and the plurality of auxiliary components or cooling channels; and shielding, from kinetic events within the vessel, the outside environment.

DETAILED DESCRIPTION

Reference will now be made in detail to example embodiments, discussed regarding reference to the accompanying drawings. In some instances, the same reference numbers will be used throughout the drawings and the following description to refer to the same or like parts. Unless otherwise stated, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limited.

Figure 1C:
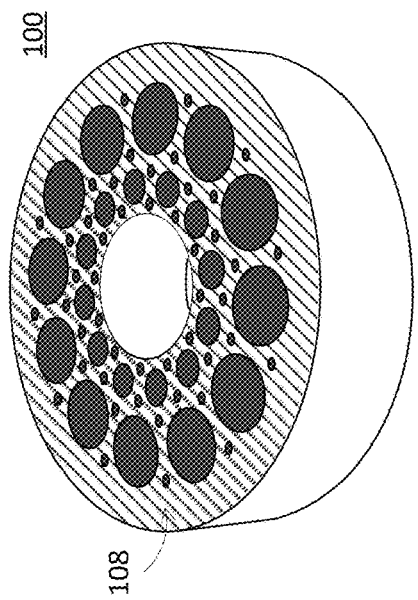
FIG. 1C is a top perspective illustration of a metallic ring under an embodiment of the containment structure described herein.
Figure 1B:
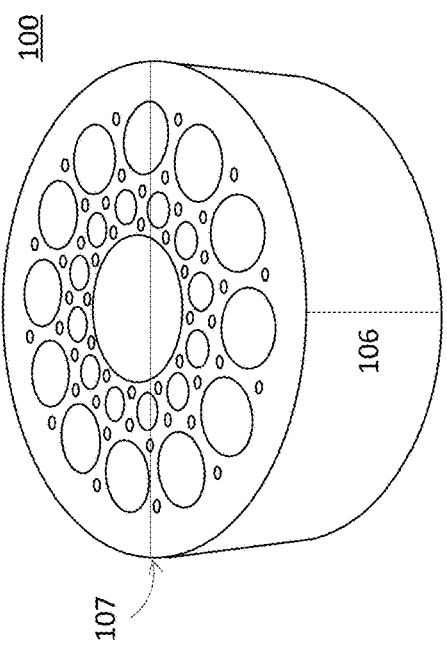
FIG. 1B is an illustration of a metallic ring under an embodiment of the containment structure described herein.
Figure 1A:
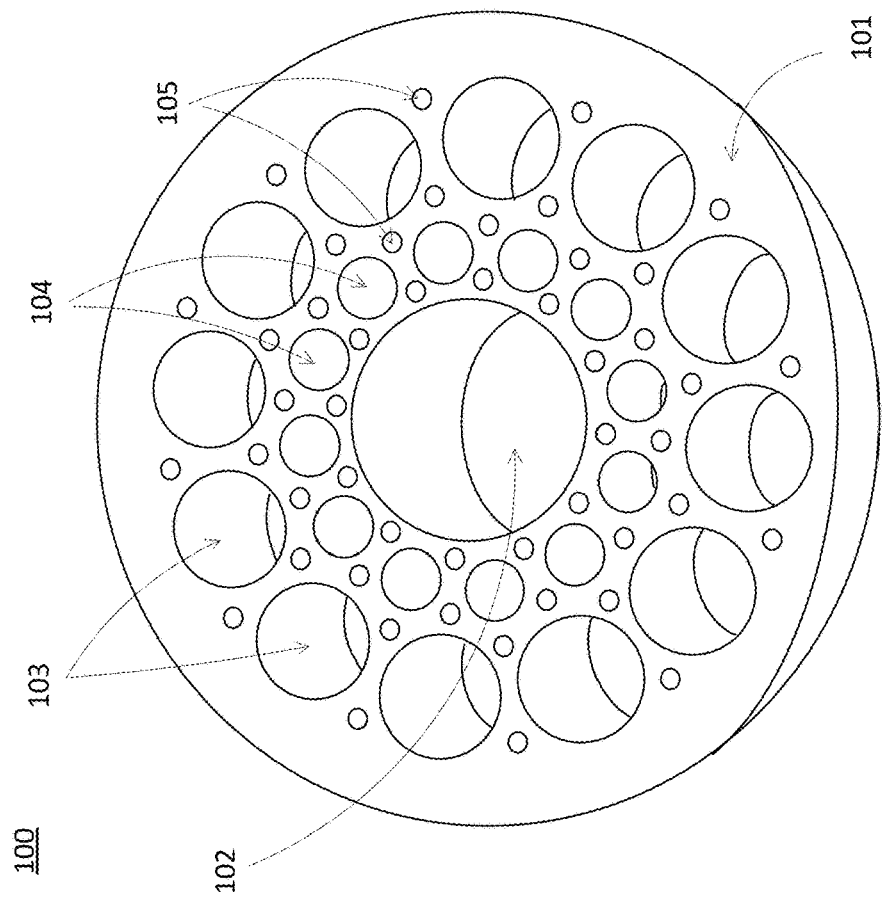
FIG. 1A is a shaded cross-sectional illustration of a metallic ring under an embodiment of the containment structure described herein.

FIG. 1A is an illustration of a metallic ring 100 consistent with some embodiments of the containment structure described herein. Metallic ring 100 may comprise an annular cylinder, in which the cylinder's wall thickness, or annulus, is defined as the region between two concentric circles on the cylinder's right section. The center 102 of the metallic ring may be defined as the region within an inner circle and may be hollow.

Metallic ring 100 may comprise any of several metals, metal alloys, or metallic composites, including but not limited to iron or steel. In some embodiments, metallic ring 100 may be produced, for example, through casting, forging, extrusion, stamping, powder metallurgy, additive manufacturing, any of the like, or some combination of these processes.

Metallic ring 100 may be uniform in composition or comprised of two or more materials. For example, the composition of metallic ring 100 may change along the radius of metallic ring 100, where metallic ring 100 is composed of a first material throughout a first portion of the wall, and a second material throughout a second portion of the wall. Additionally, metallic ring 100 may comprise one or more pockets within the metallic ring's annulus 101 where the composition of metallic ring 100 differs as compared to the rest of metallic ring 100. For example, metallic ring 100 may include voids 103, 104, or 105 within the ring's annulus 101. The voids 103, 104, and 105 may vary in size or shape. For example, in the embodiment illustrated in FIG. 1A, voids 103 may have a larger diameter than voids 104, which may have a larger diameter than voids 105. Further, voids 103, 104, and 105 may be positioned along metallic ring 100 at the same radius or may be staggered at different radiuses. In some embodiments, metallic ring 100 may be substituted for any three-dimensional shape having two flat planes, including, for example, a rectangular prism.

In other embodiments, metallic ring 100 may be substituted for a ring torus, or any other shape suitable for assembly in the manner described herein.

In some embodiments, a section of metallic ring 100 may be composed of a primary material for providing structure and a secondary material for the attenuation of radiation. For example, in some embodiments, materials with high gamma radiation attenuation coefficients for improving gamma radiation attenuation through the containment structure may be incorporated into a section of metallic ring 100. In an embodiment, attenuation of gamma radiation from the center of metallic ring 100 to the outer surface of metallic ring 100 is increased by composing a section of metallic ring 100 from lead.

In some embodiments, metallic ring 100 may include pockets or sections comprising secondary materials configured to manage thermal radiation. In some embodiments, the material makeup of metallic ring 100 may be varied, radially or in another manner, with materials having different thermal conductivities or thermal masses, and thus having different tendencies to resist or store heat. For example, metallic ring 100 may comprise materials with a high thermal mass, and thus act as a heat battery, storing heat produced by the reactor. As a result, heat may be transferred away from the reactor and into metallic ring 100.

Further, according to some embodiments of the disclosed containment structure, materials may be varied in metallic ring 100, radially or in another manner, such that material closest to the center of the ring may be designed to melt as it absorbs heat produced by the reactor core. Through melting of an innermost layer of the metallic ring, thermal energy is transferred from the reactor core to metallic ring 100 via the portion of metallic ring 100 changing from a solid state to a liquid state. Thus, in such embodiments, heat is transferred away from the reactor core.

In some embodiments, metallic ring 100 may be designed with particular attention to corrosion resistance. Containment structures are generally exposed to a variety of electrochemical influences that promote the gradual deterioration of materials, including moisture, heat, oxygen, and the like. A containment structure may experience certain internal influences, such as heat, and certain external influences, such as moisture. In some embodiments, metallic ring 100 may be designed such that corrosion is prevented, or reduced, whether caused by internal or external influences. In such embodiments, metallic ring 100 may comprise a material less prone to specific types of corrosion. In some embodiments, metallic ring 100 may be dipped or cladded, for example, in a corrosion resistant material such as to prevent corrosion of the underlying metallic ring 100. As the internal and external influences may differ, in some embodiments, it may be preferable to dip or clad only the inner or outer surface of metallic ring 100. Alternatively, the inner and outer surfaces of metallic ring 100 may be dipped or clad in different materials corresponding to the specific influence either surface may experience. In some embodiments, the metallic rings are lined with stainless steel, which is generally resistant to many types of corrosion. In other embodiments, metallic ring 100 may be comprised primarily from stainless steel.

FIG. 1B is an alternate view of metallic ring 100. Metallic ring 100 is a three-dimensional object comprising a height 106 and a diameter 107. Diameter 107 may be the sum of twice the wall thickness and the diameter of center 102. It will become clear to a person of ordinary skill in the art how to determine each of height 106 and diameter 107 in accordance with the disclosure herein.

FIG. 1C is an alternate view of metallic ring 100 illustrating a mating surface 108. Mating surface 108 may support the stacking of a plurality of metallic rings to form a containment structure, as is further described herein. Mating surface 108 may involve several different methods for sealing the interface between two metallic rings, and it will become clear to a person of ordinary skill in the art how to use mating surface 108 in accordance with the disclosed assembly of metallic rings, described herein with respect to FIG. 2B.

Figure 2C:
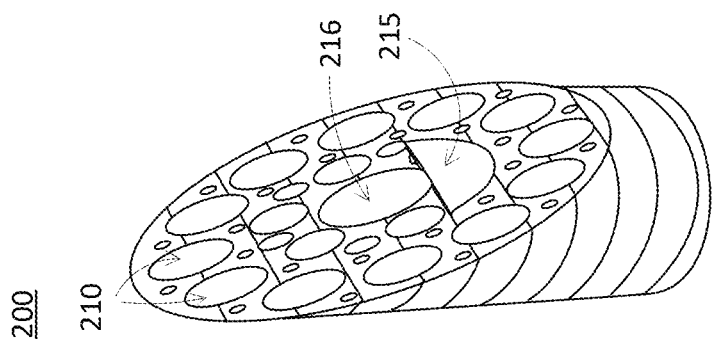
FIG. 2C is a cross sectional illustration of a partial assembly of metallic rings under an embodiment of the containment structure described herein.
Figure 2B:
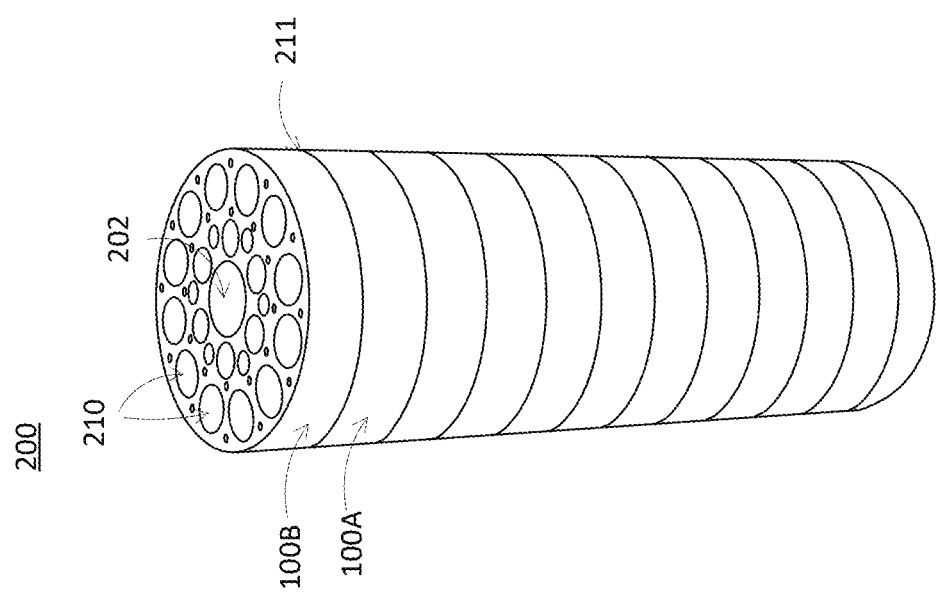
FIG. 2B is an illustration of a partial assembly of metallic rings under an embodiment of the containment structure described herein.
Figure 2A:
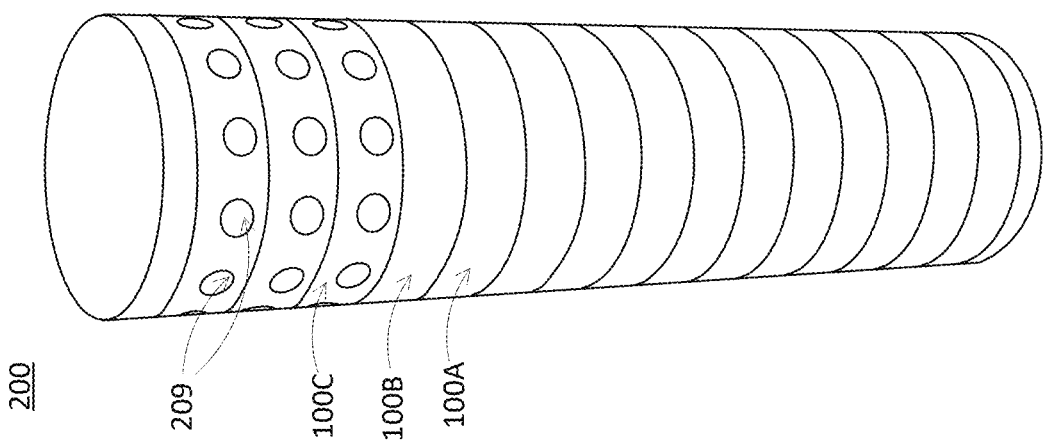
FIG. 2A is an illustration of an assembly of metallic rings under an embodiment of the containment structure described herein.

FIG. 2A is an illustration of an assembly of metallic rings consistent with some embodiments of the containment structure. As illustrated in FIG. 2A, several metallic rings, e.g., metallic rings 100A, 100B, and 100C, may be stacked axially to form an assembly 200 comprising a cylinder. An interior cavity may be formed in the center of assembly 200 and may be concentric to the assembly. The metallic rings may be positioned such that voids in first metallic ring 100A shares the same center, or axis, with voids with each subsequent metallic ring, including, as illustrated in FIG. 2A, metallic ring 100B and metallic ring 100C. The metallic rings may be fixed in an aligned position around the same central axis using axial tendons or dovetail joints, described in further detail with respect to FIGS. 7-9. As such, the voids in the metallic rings may align to form long cavities, or chambers, throughout assembly 200.

As illustrated in FIG. 2A, one or more of the metallic rings comprising the assembly may contain horizontal voids, or ports 209, that provide a pathway between the interior chambers and the external environment. Ports 209 may be fitted with, for example, pipes, cables, wiring, or any of the like for the transfer of matter between the interior chambers of assembly 200 and the external environment. In some embodiments, the ports may be fitted with cooling pipes, steam pipes, or control wiring. In addition, the ports may be fitted with one or more isolation valves that serve to isolate the assembly and reactor for maintenance, installation, removal, decommissioning, or in emergency scenarios. In some embodiments, one or more pressure release valves prevent damage to the assembly caused by over-pressurization. In some embodiments, the ports themselves may comprise cooling channels, with no additional piping necessary.

As pictured in FIG. 2A, in some embodiments, the ports may be positioned on the side of the assembly, i.e., horizontally through the metallic rings. In other embodiments, the ports may be positioned axially through the top (i.e., cap) or bottom of the assembly.

FIG. 2B is an illustration of a partial assembly of metallic rings consistent with some embodiments of the containment structure. In FIG. 2B, metallic ring 100C and subsequent metallic rings have been removed to illustrate an example of a set of chambers throughout assembly 200. As illustrated, chambers 210 may be the product of stacking multiple metallic rings such that voids 103 are concentric. Thus, chambers 210 may span the length of a plurality of metallic rings. Additionally, as illustrated, central portion 202 may be the product of stacking multiple metallic rings such that centers 102 are concentric. Thus, central portion 202 may also span the length of a plurality of metallic rings. A person of ordinary skill in the art will appreciate, through this disclosure, how the same technique can be applied to voids 104 and voids 105.

In the embodiment depicted in FIG. 2B, central portion 202 and chambers 210 are cylindrical; however, the present disclosure is not so limited, and could be extended to other-shaped cavities, including cavities comprising rectangular or triangular prisms. Further, the cavities may not be uniform in size or shape throughout the assembly. Rather, in some embodiments, the size or shape of the cavities may vary according to the desired characteristics and requirements of a particular application. For example, a particular chamber may comprise a larger diameter near the top of assembly 200, and a smaller diameter near the bottom of assembly 200. In some embodiments, the size or shape of a particular chamber may be altered by varying the size or shape of the voids in the metallic rings during manufacturing of the metallic rings. That is, for example, a ring comprising a larger void may be stacked above a ring comprising a smaller void. Additionally, or alternatively, the chambers may be bored with specific diameters, tapers, or steps after initial manufacturing and assembly of the metallic rings.

In some embodiments, the metallic rings may be designed such that the assembly of metallic rings functions as a radiation bioshield. For example, the assembly 200 may comprise a minimum thickness, for the material used, such as to attenuate gamma radiation to a level suitable for interaction with human or other surrounding biology. Further, the properties of the materials comprising each metallic ring may be varied such as to vary the attenuation properties of the assembly.

When light, sound, particles, or other energy or matter, such as gamma radiation, passes through the metallic rings comprising the assembly, it will lose intensity through two processes: absorption (or capture) and scattering. Absorption of electromagnetic radiation is the process through which matter takes up electromagnetic energy and transforms it into internal energy, such as thermal energy. Scattering is the process through which energy is removed from a beam of electromagnetic radiation and reemitted with a change in direction, phase, or wavelength.

The capacity of a metallic ring to attenuate radiation through absorption and scattering is represented by the absorption and scattering coefficients of the materials comprising the metallic ring, which together comprise the material's overall attenuation coefficient.

The attenuation coefficient of the material, i.e., the material's attenuation per unit mass, can be calculated by dividing the material's attenuation coefficient by its mass density. In other terms, mass attenuation density is equal to $$\frac{\mu}{\rho_m},$$

where $\mu$ is the attenuation coefficient of the material and $\rho_m$ is the mass density of the material. The mass density varies by material, while the attenuation coefficient varies by material and photon energy. Specifically, $$\mu = -\frac{1}{\Phi_e}\frac{d\Phi_e}{dz}.$$

Accordingly, different materials vary with respect to their attenuation properties, and the attenuation properties of the metallic rings can be altered through deliberate selection of the constituent materials.

Different materials can be arranged, for example, layered, such as to vary the overall attenuation properties of the metallic rings. For use in the example below, a person of ordinary skill in the art would appreciate that Cesium-137 is a common byproduct of nuclear fission. In some embodiments, the metallic ring may be designed such that radiation produced by decaying Cesium-137, through the decay of the excited nuclear isomer of Barium-137, is shielded from the outside environment.

In some embodiments, the metallic rings may be primarily comprised of an iron alloy with a mass density of 7,874 kg/m$^3$. The iron alloy may have an attenuation coefficient of 0.5821 reciprocal meters, for peak photon emission resulting from the decay of fission product Cesium-137 (662 keV). Accordingly, the mass attenuation coefficient of a metallic ring for gamma ray photons produced by Cesium-137 may be 7.923×10$^{-5}$ m$^2$/kg. In some embodiments, sufficient attenuation of radiation may be achievable by increasing the unit mass of the metallic ring. In other embodiments, however, a section, liner, shield, or the like may be incorporated to improve the attenuation of radiation. For example, lead may have a mass density of 11,343 kg/m$^3$ and, for peak photon emission resulting from the decay of Cesium-137, an attenuation coefficient of 1.2419 reciprocal meters. Accordingly, the mass attenuation coefficient of a metallic ring for gamma ray photons produced by Cesium-137 may be 1.095×10$^{-4}$ m$^2$/kg. Thus, by incorporating lead into an iron metallic ring, the mass attenuation coefficient of the metallic ring may be increased to $$7.923 \times 10^{-5} \leq \frac{\mu}{\rho} \leq 1.095 \times 10^{-4} \text{ m}^2/\text{kg},$$

and more high-energy Cesium-137 radiation may be attenuated per unit mass of the metallic ring. In some embodiments, chambers 210 are filled with lead for the purpose of attenuating radiation.

A person of ordinary skill in the art would appreciate that circumstances described above are only an example, and similar design choices apply to other types of gamma radiation, neutron radiation, or other energy or matter effect. For example, like gamma radiation, neutron radiation is also subject to absorption and scattering. Certain materials, such as boron, possess special aptitude for absorbing neutron radiation. By incorporating boron within the assembly, the external environment may be protected from neutron radiation produced by the nuclear reactor. Boron may be incorporated into the assembly of metallic rings through any of the aforementioned methods, including incorporating boron or a boron-alloy, such as boron steel, into a liner, within chambers 210, throughout the primary material comprising the metallic rings, or via any similar method.

As another example of the radiological advantages of the present disclosure, in some embodiments, the metallic ring may be comprised primarily from cast iron. Iron is an absorber of radioactive isotopes of Iodine, including Iodine-131 and Iodine-128. A person of ordinary skill in the art would appreciate that Iodine-131 and Iodine-128 are common products of nuclear fission and are particularly dangerous elements, known to cause thyroid cancer in humans. The unique construction of the metallic rings from cast iron (whether entirely, partially, in pockets, lined, or otherwise), in some embodiments, allows the disclosed containment structure to shield humans, or other biology, in manners not currently known in the art. In some embodiments, for example, the metallic rings may comprise materials specifically for the capture of radioiodine, such as iron oxide, silver/iron oxide nanocomposites, or iron-metal-organic materials.

Accordingly, by varying the properties of materials comprising each metallic ring, or by creating pockets of materials having different properties, the metallic ring may be designed to have sufficient mass attenuation for the necessary reduction of gamma radiation, neutron radiation, or other energy or matter effect.

The metallic rings may be assembled to be leak-tight to mitigate the movement of radionuclides from inside the assembly to the external environment. In some embodiments, the assembly may be airtight. For example, airtightness may allow the containment structure to maintain absolute containment of certain particulates. In other embodiments, containment of these particles may be maintained via alternative means, for example, by creating negative pressure within the containment structure. In further embodiments, containment of these particulates may not be required for safe operation of the reactor.

In some embodiments, the assembly may comprise gaskets, a-rings, structural adhesive, welding, brazing, or any other sealing method at an interface between each subsequent metallic ring. For example, as illustrated in FIG. 2B, a method of sealing may exist at the interface 211 between metallic ring 100A and metallic ring 100B. Some examples of products associated with these sealing methods include chemical adhesives and sealants, crush gaskets, graphite gaskets, and a-rings. These sealing methods may be applied, for example, at the metallic ring's mating surface (element 108 in FIG. 1 C). The sealing method of any specific embodiment may be selected based on the sealing method's ability to withstand certain pressure, heat, and radiological environments. For example, the sealing method of some embodiments should ensure sufficient protection from gamma radiation, neutron radiation, and the like escaping the assembly at the interface.

A person of ordinary skill in the art should appreciate that any of the aforementioned methods of managing radiation throughout the assembly may be used in conjunction with one another. For example, in some embodiments, the assembly may be designed to simultaneously manage gamma radiation, neutron radiation, and the movement of radionuclides.

In some embodiments, the metallic rings may be designed such that the assembly of metallic rings manages heat produced by a nuclear reactor and associated equipment. For example, the assembly 200 may comprise a minimum thermal mass such as to store thermal energy produced by a nuclear reactor and provide inertia against temperature fluctuations.

The thermal mass of a body ($c_{th}$), i.e., the ability of a body to store thermal energy, can be approximated by the product of the mass of the body and the isobaric specific heat capacity of the material averaged over a temperature range in question. In other terms, thermal mass is equal to m×$c_p$, where m is the mass of the body and $c_p$ is the isobaric specific heat capacity of the material averaged over temperature range in question. Thus, through selection of a suitable material, the assembly can be designed such that the thermal mass is sufficient to store heat produced by the nuclear reactor and avoid significant temperature fluctuations. For example, a material with a high density, and thus a large mass at a standard volume, may be preferred in embodiments benefiting from a large thermal mass.

Simultaneously, in some embodiments, the assembly may be configured to provide efficient heat transfer from the nuclear reactor to the external environments, or to cooling loops within the assembly itself. Accordingly, in some embodiments the metallic rings may be formed from a material having a high thermal conductivity at the relevant temperature range, such that heat is transferred from the nuclear reactor, through the assembly, and to a heat dissipating apparatus or the outside environment.

In some embodiments, the metallic rings may be primarily comprised of an iron alloy. By utilizing an iron material having a large mass and high thermal conductivity, for certain implementations, the goals of heat storage and heat transfer can be met concurrently. For example, while iron has a lower specific heat capacity than concrete, iron is over three times as dense, resulting in a thermal mass, per unit volume, that is greater than that of concrete. Simultaneously, the thermal conductivity of iron far exceeds that of concrete. Accordingly, both goals may be achieved. In other embodiments, however, such as those implementing other methods of heat management, concrete may be a suitable material for the assembly.

FIG. 2C is an illustration of a partial assembly of metallic rings consistent with some embodiments of the containment structure. In FIG. 2C, a cross-section has been cut diagonally through assembly 200 to illustrate the chambers. Nuclear reactor vessels are generally cylindrical in shape, with control rods and a control rod drive mechanism interacting with the reactor via the reactor vessel head. In some embodiments, the reactor vessel itself features a larger diameter, i.e., is wider, than the control rod assembly. Accordingly, in some embodiments of the present invention, central portion 202 may comprise a lower section 215 and an upper section 216. Via adjusting the diameter of the center 102 of the constituent metallic rings, lower section 215 may be designed with a larger diameter than upper section 216, such that lower section 215 surrounds the nuclear reactor vessel and upper section 216 surrounds the control rod assembly. In some embodiments, the interior cavity may contain a reactor vessel, for example, a pressure vessel containing the nuclear reactor. Alternatively, the interior wall of the cavity may be the reactor vessel, and the nuclear reactor may be placed directly into the cavity.

The assembly 200 may act as a protective barrier between the reactor and the external environment. For example, assembly 200 may protect the reactor from external kinetic hazards, such as an explosion. Further, assembly 200 may protect the external environment from internal kinetic hazards, such as a control rod ejection event. To this extent, the metallic rings may be designed with an appropriate shape, material, thickness, and brittleness to ensure that containment is maintained. Likewise, the assembly of metallic rings may be designed as to contain immense pressures without breaking containment.

In some embodiments, the metallic rings may be constructed and assembled off-site, i.e., at some location other than the nuclear power plant. For example, the metallic rings may be constructed at a metal forger and assembled nearby. Accordingly, it may be necessary to transport the assembly of metallic rings to the nuclear power plant location.

Figure 3C:
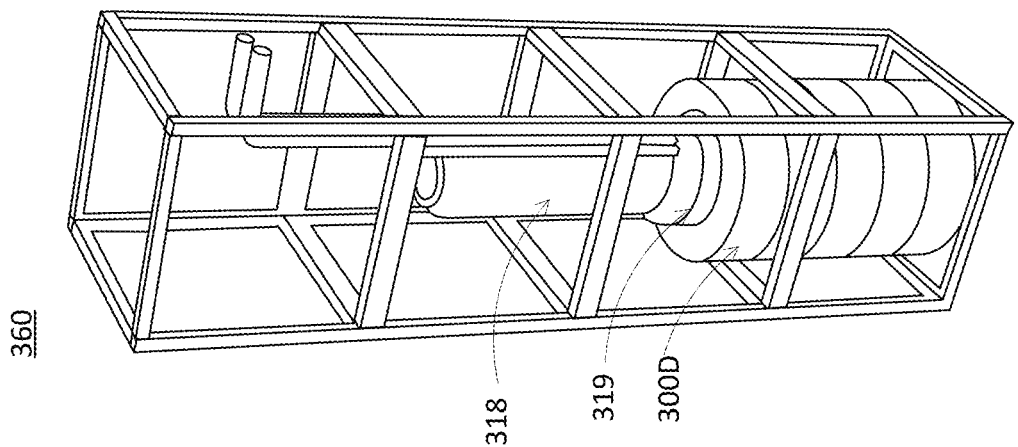
FIG. 3C is an illustration of a partial assembly of metallic rings and supporting structure under an embodiment of the containment structure described herein.
Figure 3B:
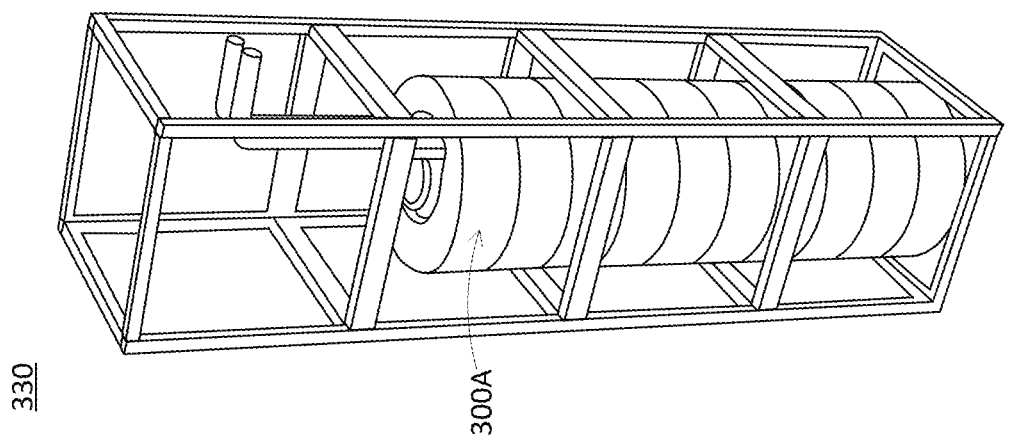
FIG. 3B is an illustration of a partial assembly of metallic rings and supporting structure under an embodiment of the containment structure described herein.
Figure 3A:
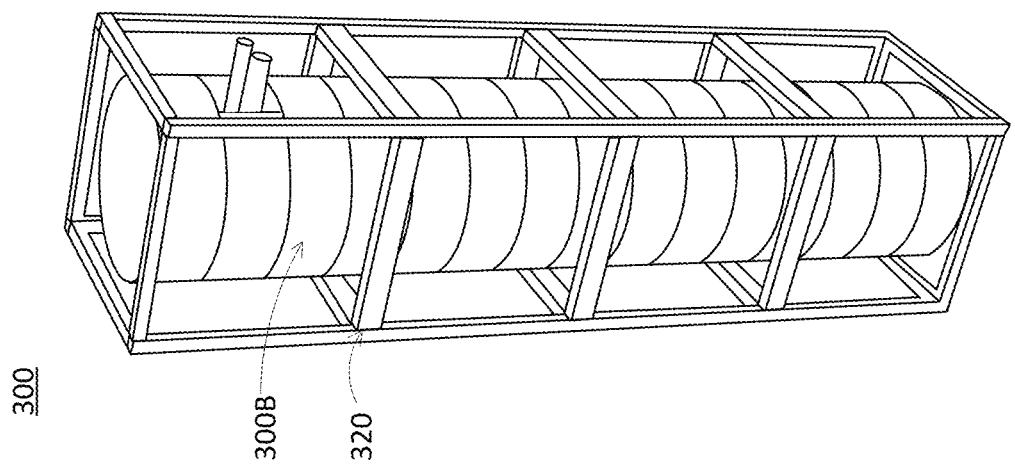
FIG. 3A is an illustration of an assembly of metallic rings and supporting structure under an embodiment of the containment structure described herein.

FIG. 3A is an illustration of a containment assembly 300. Containment assembly 300 may comprise assembly 200 and a supporting structure 320. As illustrated, in some embodiments, assembly 200 may be placed or framed within supporting structure 320, such as a modular steel container. In some embodiments, supporting structure 320 is constructed around assembly 200 for ease of transport. For example, supporting structure 320, such as a modular steel container, may provide attachment points for the hoisting or rigging of assembly 200 during transportation. Additionally, supporting structure 320 may ease the placement of assembly 200 at the nuclear power plant location. In some embodiments, supporting structure 320 is never removed from assembly 200. In some of these embodiments, assembly 200, complete with supporting structure 320, is positioned within the nuclear power plant, and supporting structure 320 provides mounting or attachment points for connecting assembly 200 to the plant. For example, supporting structure 320 may receive bolts that attach supporting structure 320 to some other structure existing at the nuclear power plant location.

A person of ordinary skill in the art should appreciate that, by placing assembly 200 within supporting structure 320, it may be possible to quickly and efficiently swap, i.e., remove and replace, assembly 200 from the nuclear power plant. In these embodiments, swapping of assemblies, complete with nuclear reactors, may allow for the reactors to be refueled off-site or transported off-site for decommissioning and final storage. For example, the nuclear reactor within assembly 200 may be transported, with assembly 200 providing safe, secure containment, to a secure location for refueling of the nuclear fuel. Further, additional maintenance of the reactor or associated equipment within assembly 200 may be conducted in a similar manner.

FIG. 3B is an illustration of a partial containment assembly 330 consistent with some embodiments of the containment structure. In FIG. 3B, some metallic rings have been removed from assembly 200 to illustrate the interior cavities.

FIG. 3C is an illustration of a partial containment assembly 360 consistent with some embodiments of the containment structure. In FIG. 3C, additional metallic rings have been removed from assembly 200 to illustrate the interior chambers. In this embodiment, the central portion is partitioned into an upper section and a lower section, as was previously described with respect to FIG. 2C. The upper section comprises the center voids of the upper metallic rings 300A. The lower section comprises the center voids of lower metallic rings 300D. In the illustrated embodiment, the center of metallic ring 300A comprises a smaller diameter than the center of metallic ring 300D. By decreasing the diameter of metallic ring 300A as compared to metallic ring 300D, metallic ring 300A may securely encase control rod assembly 318, while metallic ring 300D may securely encase reactor vessel 319. Accordingly, unwanted movement of the control rod assembly and reactor vessel may be avoided.

Figure 4:
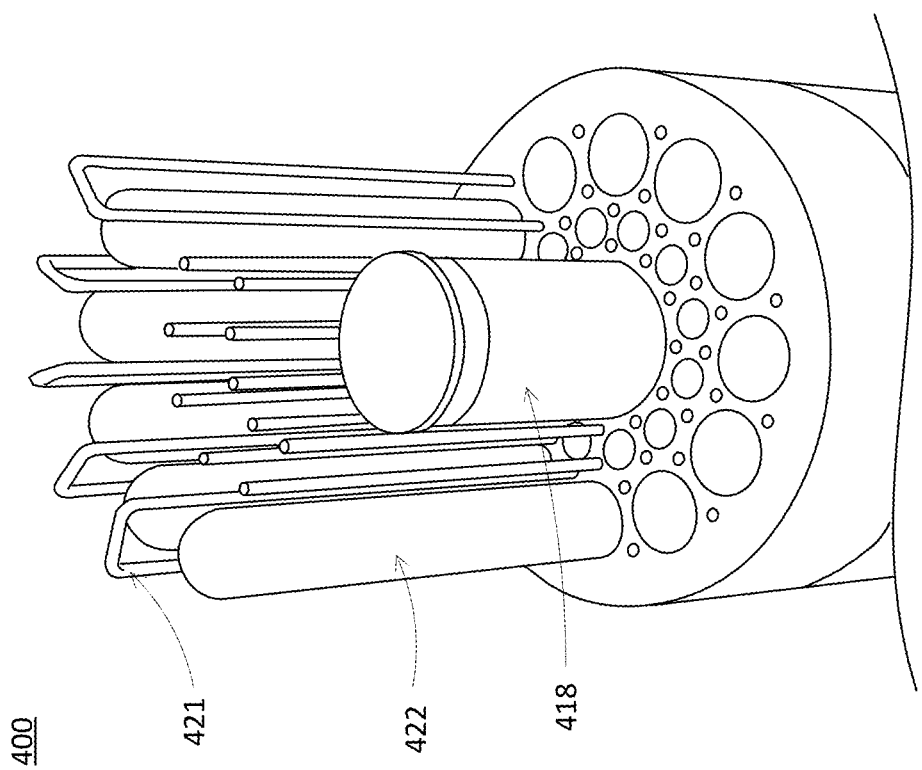
FIG. 4 is a top perspective illustration of auxiliary equipment incorporated within the containment structure under an embodiment of the containment structure described herein.

FIG. 4 is a top perspective illustration of partially filled chambers within assembly 400 consistent with some embodiments of the containment structure. Assembly 400 may incorporate some or all of the features discussed with respect to assembly 200. As pictured, in some embodiments, chambers within assembly 400 may comprise auxiliary equipment 422 for operating the nuclear reactor. The auxiliary equipment may include, for example, the pressurizer, heat exchanger, or pumping equipment. The chambers may be designed such that the clearance between the chamber wall and the auxiliary equipment is kept to a minimum. To this extent, the chamber may be shaped to match the shape of the auxiliary equipment. By incorporating auxiliary equipment 422 within the chambers, auxiliary equipment 422 may benefit from the radiological shielding properties of assembly 400. For example, in a traditional pressurized water reactor, the pressurizer is exposed to a fluid that, via interaction with radiation produced by the reactor, is radioactive. By comprising the pressurizer within the chambers of assembly 400, radiation from the pressurizer is shielded from the external world. A person of ordinary skill in the art should understand and appreciate how this teaching could be expanded to the heat exchanger, various pumps, or other auxiliary equipment commonly utilized with nuclear reactors.

Further, auxiliary equipment 422 may also benefit from the thermal properties of assembly 400. For example, in the embodiment wherein the pressurizer is comprised within the chambers of assembly 400, assembly 400, acting as a heat battery, may prevent unwanted heat fluctuation within the pressurizer, promoting reliable operation of the pressurizer. The structure of assembly 400 may also be configured to provide protection for the auxiliary equipment from internal or external kinetic events, as previously described herein.

Additionally, in some embodiments, the chambers may comprise cooling channels 421. Cooling channels 421 may comprise the primary cooling loop, used to transfer heat to a steam generator. In some embodiments, cooling channels 421 may comprise a supplementary cooling loop for transferring excess heat away from the reactor vessel. Cooling channels 421 may be implemented by installing cooling pipes within the chambers. In some embodiments, coolant runs through the chambers with no additional piping necessary. Coolant leaving the reactor may be directed to cooling equipment in the external environment, such as fin fans, radiators, or cooling towers. Additionally, or alternatively, waste heat may be directed off-site and used to fuel other industrial processes.

Cooling channels 421 may be positioned within the wall of the assembly 400 at the same radius or may be staggered at different radiuses. For example, in some embodiments, staggering of cooling channels 421 may allow for additional cooling loops to be included within the wall of assembly 400 before undermining the physical strength of assembly 400. The heat dissipation requirements of assembly 400 may be considered when determining whether cooling channels 421 should be staggered.

Any of several different types of fluids may flow through cooling channels 421. For example, any of water, heavy water, oil, glycol, dielectric fluid, sodium, sodium alloys, fluoride-salt mixtures, lead, and lead alloys may be suitable cooling fluids depending on the specific application. It should be understood that one or more of the heat capacity, thermal conductivity, vaporization point, and corrosion resistance of a particular fluid may be important considerations in choosing a cooling fluid. Likewise, one or more of operating temperature, operating pressure, and material properties of cooling channels 421 may be important considerations. In some embodiments, lead-bismuth eutectic may be an ideal coolant due to a high boiling point, eliminating or reducing the need for pressurization in high-temperature applications. Such low-pressure systems provide many benefits, including a reduction in capital cost via the omission of the pressurization system and a reduction in the likelihood of a loss of coolant accident due to coolant vaporization. Further, lead-bismuth eutectic's nonreactivity with water or air and its tendency to absorb gamma radiation may provide additional safety benefits.

Figure 5:
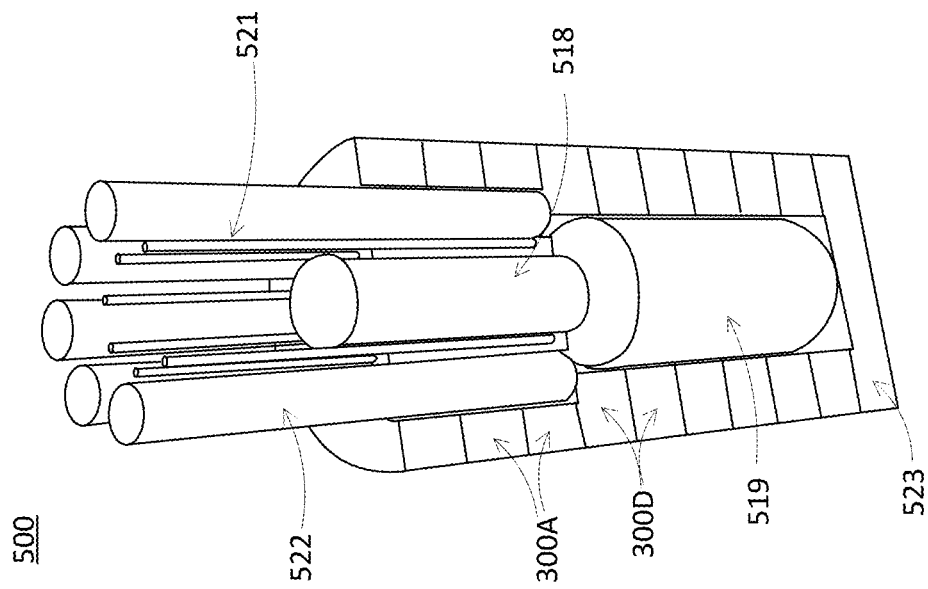
FIG. 5 is a cross-sectional view of auxiliary equipment incorporated within the containment structure under an embodiment of the containment structure described herein.

FIG. 5 is a cross-sectional view of auxiliary equipment 422 incorporated within assembly 500 consistent with some embodiments of the containment structure. Assembly 500 may comprise some or all of the features previously discussed with respect to assembly 200 and assembly 400. In FIG. 5, assembly 500 has been sliced vertically to illustrate the components within. In some embodiments, the plurality of metallic rings (e.g., 523, 300D, 300A) comprising assembly 500 are not uniform. Instead, the metallic rings may vary with respect to inner diameter; location, size, and number of voids; composition; and the like, as examples. As illustrated in FIG. 5, the base of the assembly may comprise a solid metallic ring 523 having no voids or hollow portions. In other embodiments, the base of the assembly may comprise voids in accordance with the above teachings. Additionally, in some embodiments, the base of the assembly may include an indent, or saddle, designed to hold the bottom of a reactor vessel, for the purpose of providing additional support to the reactor vessel. In this sense, the base of the assembly may be considered a mechanical fixture for a reactor vessel. Further, the base of the assembly may comprise a core-catcher, i.e., a device designed to catch the molten core of a nuclear reactor, in the event of meltdown, and prevent the core from escaping containment. In such an embodiment, the base of the assembly may comprise a thermally resistant material, such as a ceramic, to prevent the molten core from melting through the base. Accordingly, a person of ordinary skill in the art should appreciate the unique advantages of varying the inner diameter; location, size, and number of voids; and composition of the bottom of the assembly, as taught herein.

A lower section may be comprised from lower metallic rings 300D. As pictured in FIG. 5, nuclear reactor vessel 519 may be placed within the lower section of assembly 500 such that assembly 500 comprises a containment structure around nuclear reactor vessel 519. In some embodiments, nuclear reactor vessel 519 may be contained in a sub-structure, such as a pressure vessel. In other embodiments, the inner walls of metallic rings 300D may function as the reactor vessel itself. Lower metallic rings 300D surrounding the nuclear reactor vessel 519 may be exposed to high-intensity radiation. As previously described, these metallic rings may be designed such as to minimize exposure of radiation to the external environment through a variety of methods.

An upper section may be comprised from upper metallic rings 300A. As pictured in FIG. 5, control rod assembly 518 may also be placed within assembly 500 such that assembly 500 comprises a containment structure around control rod assembly 518. Upper metallic rings 300A surrounding the control rod assembly 518 may be exposed to high-intensity radiation. As previously described, these metallic rings may be designed such as to minimize exposure of radiation to the external environment through a variety of methods.

Further, auxiliary equipment 522 may be placed within the channels comprised from voids in the upper metallic rings 300A such that the assembly 500 comprises a containment structure around auxiliary equipment 522. In some embodiments, auxiliary equipment 522 may be contained in a sub-structure, such as a pressure vessel. In other embodiments, the chambers comprised from upper metallic rings 300A may function as the pressure vessel itself. Upper metallic rings 300A surrounding the auxiliary equipment may be exposed to high-intensity radiation. As previously described, these metallic rings may be designed such as to minimize exposure of radiation to the external environment through a variety of methods.

The top, or cap, (not pictured) of assembly 500 may comprise a solid metallic ring having no voids or hollow portion. In some embodiments, the top of assembly 500 may include voids for inserting axial tendons 521, such as bolts that span the height of assembly 500, for providing additional structural support and ensuring tight seals at the interfaces between metallic rings. In other embodiments, axial tendons may span less than the full height of the assembly, for example, from the top of assembly 500 to only the adjacent metallic ring. Axial tendons 521 are described in more detail below.

Figure 6B:
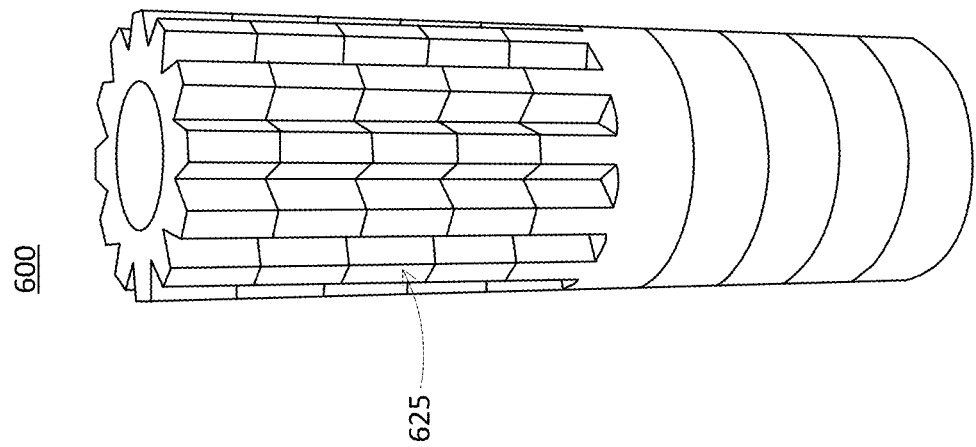
FIG. 6B is an alternate illustration of an example of an assembly of metallic rings optimized for thermal management described herein.
Figure 6A:
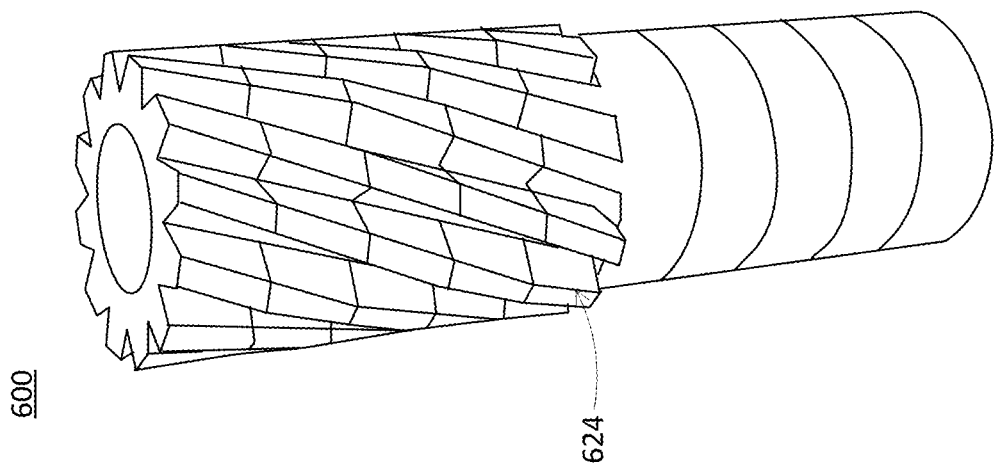
FIG. 6A is an illustration of an example of an assembly of metallic rings optimized for thermal management described herein.

FIG. 6A is an illustration of an example of an assembly of metallic rings optimized for thermal management. In some embodiments, an assembly 600 may manage heat by providing a heat path from the reactor to a suitable heat sink, such as, for example, the air surrounding the assembly. Heat may be transmitted through the materials comprising the metallic rings to the outside surface of assembly 600. In some embodiments, the outside surface of assembly 600 may comprise fins 624 designed to increase the surface area of the outside surface. As such, assembly 600 may act as a passive heat sink, using the natural convective forces of the surrounding air to cool the reactor. In some embodiments, assembly 600 may be designed as to dissipate the entirety of the reactor's thermal power through the passive heat sink, and thus not require active cooling. In some embodiments, assembly 600 may be designed to dissipate the entirety of the nuclear fuel's thermal power under a meltdown condition without active cooling.

FIG. 6B is an illustration of a second example of an assembly of metallic rings optimized for thermal management. Any of several different fins designs may be incorporated in some embodiments of the present invention. While exemplary fins 624 in FIG. 6A twist around assembly 600, exemplary fins 625 in FIG. 6B extend straight down assembly 600. Different fin designs may be considered to promote natural convective circulation in the specific nuclear power plant environment.

In some embodiments, fins 624, 625 may span the entire height of the assembly. In other words, the fins may extend from the top of assembly 600 to the base. In other embodiments, such as those illustrated in FIGS. 6A and 6B, the fins may span only a portion of the assembly. The design of the fins may depend on the specific implementation of the assembly. For example, in an embodiment where the assembly is partially buried in the ground, it may be preferable for the fins 624, 625 to span only from the top of the assembly to the point at which the assembly contacts the ground. Other considerations a person of ordinary skill should take into account when designing the fins include the thermal output of the reactor and the ambient temperature of the environment surrounding the assembly.

Figure 7:
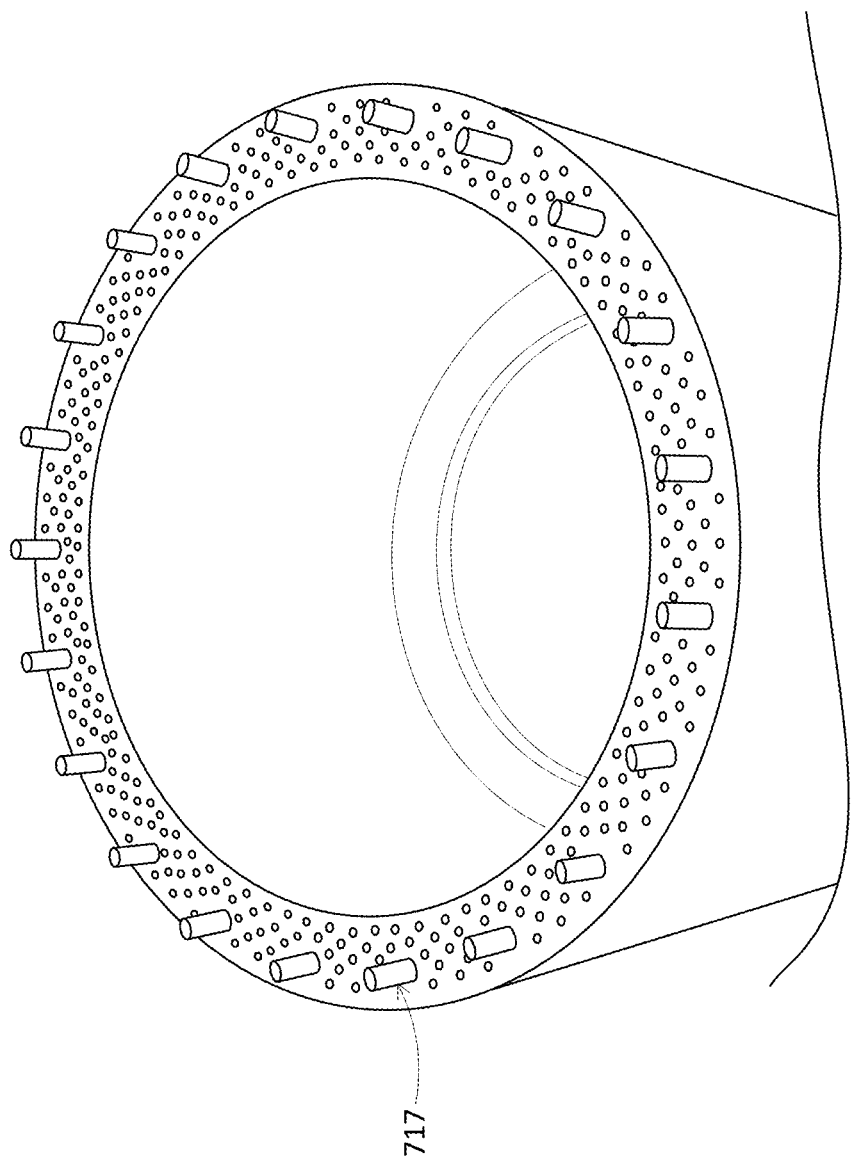
FIG. 7 is a cross-sectional view of an example of an assembly of metallic rings illustrating structural members described herein.

FIG. 7 is a cross-sectional view of an example of an assembly of metallic rings illustrating structural members described herein. In some embodiments, chambers within the assembly may comprise axial tendons 717 for additional structural support for the assembly. In some embodiments, axial tendons may comprise bolts, screws, wires, cords, or similar.

Axial tendons 717 may be placed within the channels comprised from voids in the metallic rings such that the axial tendons 717 run through the assembly, or a portion of assembly. For example, axial tendons 717 may fasten the top, or cap, (not pictured) of the assembly to the bottom of the assembly. As another example, axial tendons 717 may connect any two or more adjacent metallic rings. In such an example, two or more interconnected rings may form a group of rings that is then fastened to a subsequent group of rings. For example, a first group of rings (e.g., 1-3) may be fastened together sequentially by one or more axial tendon(s), while a second group of rings (e.g., 4-6) may be similarly fastened together. To connect the first group of rings (1-3) with the second group of rings (4-6), additional axial tendons may span the length from ring 2 to ring 5, for example, such that rings 3 and 4 are fastened together. A person of ordinary skill in the art will understand that the exemplary arrangement of rings is only one of many arrangements consistent with the present disclosure.

In some embodiments, the axial tendons may interface with the nuclear reactor vessel such that the nuclear reactor vessel is secured by the axial tendons.

Figure 8:
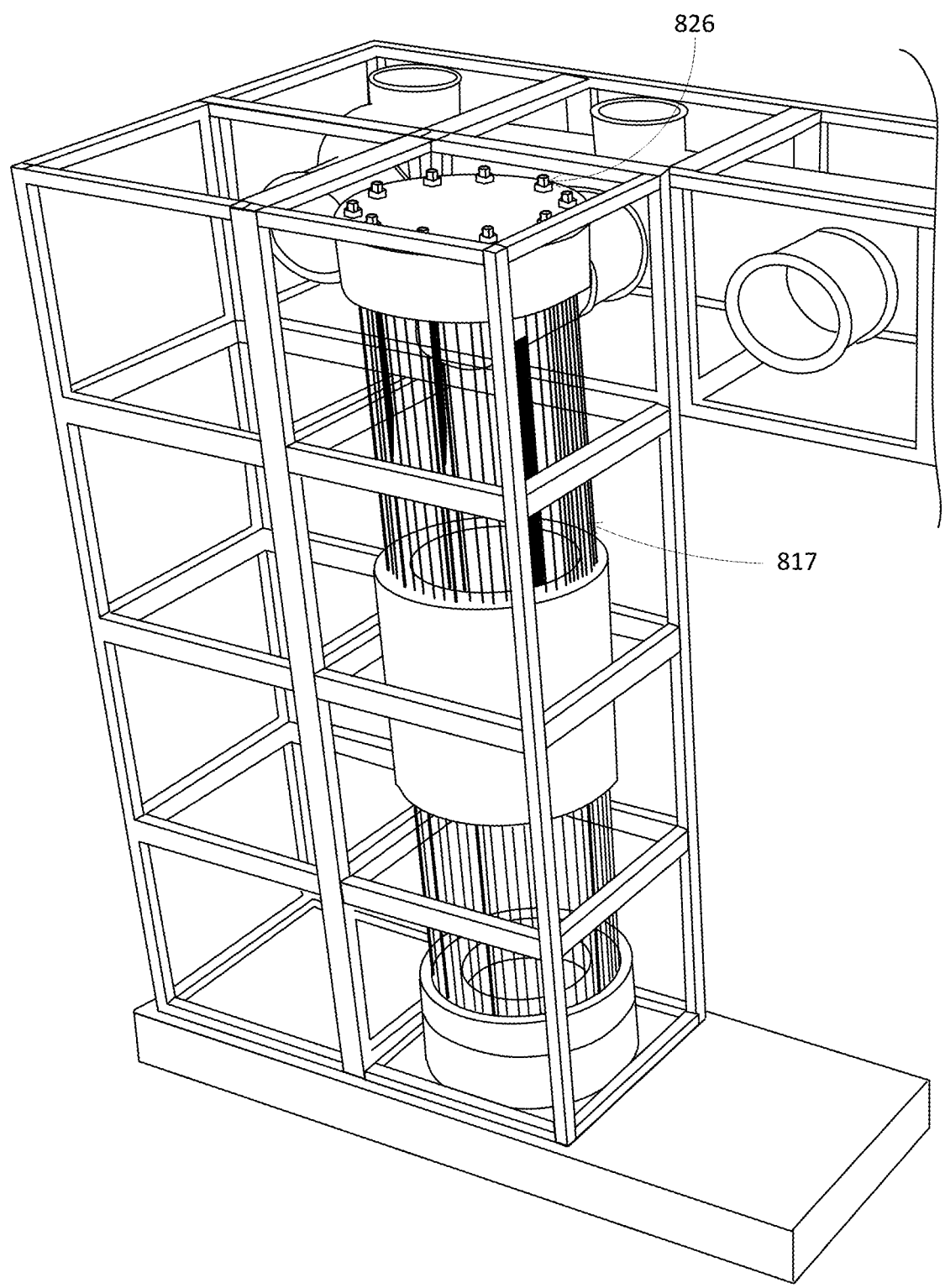
FIG. 8 is a cut-away view of a partial implementation of an assembly of metallic rings under an embodiment of the containment structure described herein.

FIG. 8 is a cut-away view of a partial implementation of an assembly of metallic rings according to an embodiment of the containment structure described herein. In FIG. 8, portions of the assembly have been removed to illustrate the supporting members running throughout the assembly in this embodiment. For example, axial tendon 817 may comprise a through bolt connecting from the top of assembly 200 to the bottom of assembly 200, providing tension on the assembly necessary for keeping the metallic rings securely fastened together. In some embodiments, as discussed herein, axial tendon 817 may terminate with nut 826 on the outer face of the top of assembly 200. Incorporating nut 826 at the top of assembly 200 may enhance ease of maintenance, as nut 826 may be readily accessible for measuring torque values. Additionally, incorporating nut 826 at the top of assembly 200 may allow for the base of the assembly to be flush, providing for secure mounting against the floor of the nuclear power plant.

Figure 9:
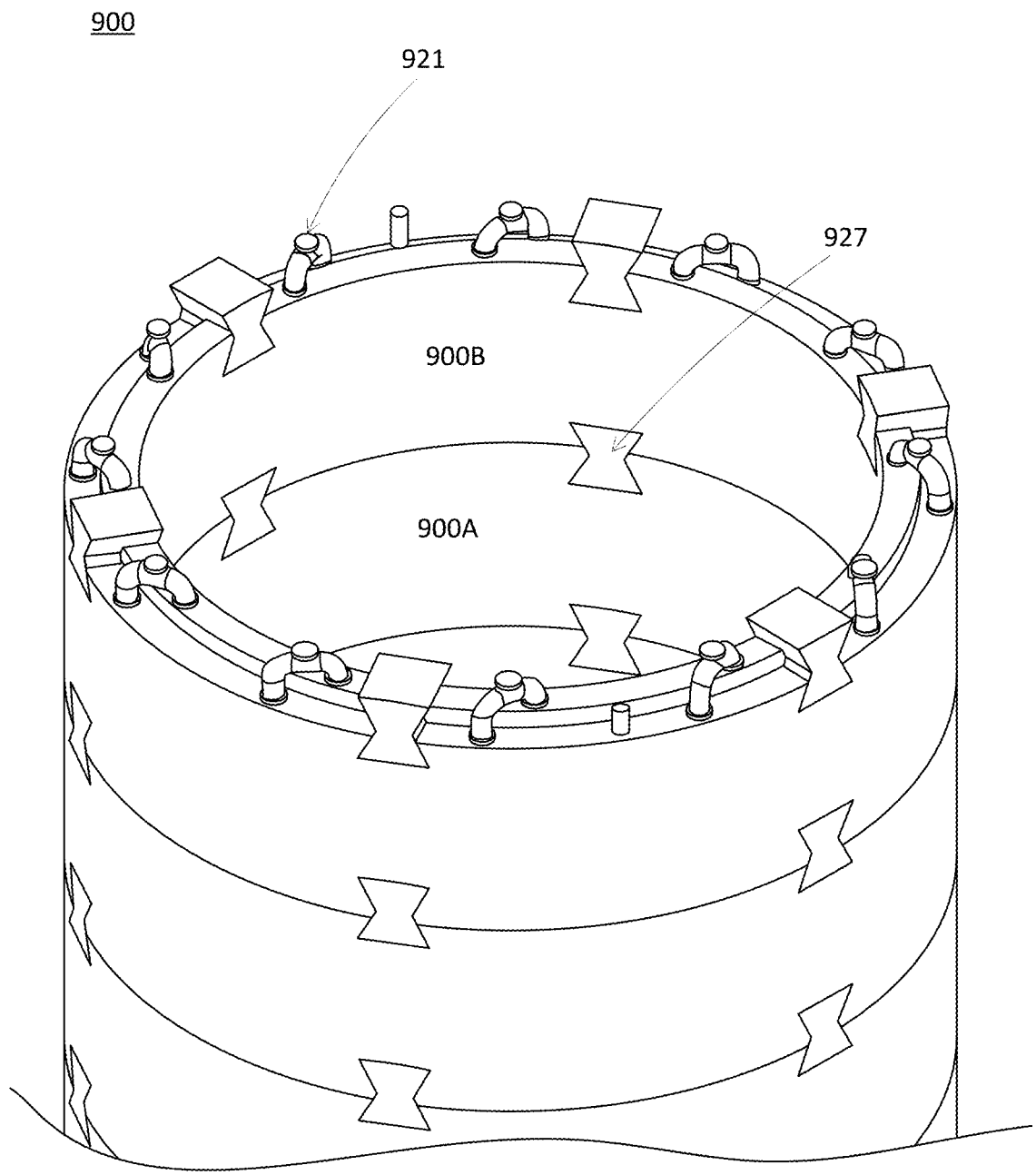
FIG. 9 is a cross-sectional view of an example of an assembly of metallic rings illustrating structural joints under an embodiment of the containment structure described herein.

FIG. 9 is a cross-sectional view of an example of an assembly of metallic rings illustrating structural joints under an embodiment of the containment structure described herein. In FIG. 9, a portion of the assembly has been removed to illustrate an additional or alternative method of securely fastening two or more metallic rings together. Specifically, in some embodiments, one or more portions of the metallic rings may be intentionally void as to accept one or more fastening joints for affixing adjacent metallic rings together. For example, in FIG. 9, dovetail joint 927 is inserted into one void at the top of metallic ring 900A and another void at the base of metallic ring 900B. Due to the tensile strength provided by dovetail joint 927, metallic ring 900A may be securely affixed to metallic ring 900B. Each set of adjacent metallic rings may include one or more dovetail joints depending on the structural requirements of the specific application. In some embodiments, dovetail joint 927 may comprise any of several types of affixing joints, including through joints, half-blind joints, full blind joints, and sliding joints, as examples. It should be understood that fastening joints may be used as an alternative to axial tendons or in addition to axial tendons depending on the requirements of the specific application.

Disclosed embodiments may include any one of the following bullet-pointed features alone or in combination with one or more other bullet-pointed features, whether implemented as a method, process, apparatus, and/or device:

- mitigating, by using a physical barrier, the movement of radionuclides from inside a containment structure to a surrounding space;
- mitigating, by using a physical, airtight barrier, the movement of radionuclides from inside a containment structure to a surrounding space;
- shielding, by varying the alloy properties throughout the containment structure, an exterior of the containment structure from radiation produced inside of the containment structure;
- regulating, by transferring thermal energy, a temperature within the containment structure, wherein the containment structure transmits heat from an inside wall of the containment structure to an external wall of the containment structure;
- regulating, by storing thermal energy, the temperature within the containment structure, wherein the containment structure absorbs heat produced inside of the containment structure;

wherein the containment structure is partially buried underground;

wherein the external wall of the containment structure is shaped such that an exterior surface area of a portion of the external wall exposed above ground is increased compared to an exterior surface area of a portion of the external wall buried underground;

wherein the containment structure comprises one or more materials having different phase change temperatures, wherein one or more of the materials is configured to undergo a phase change to absorb heat;

wherein the metallic rings are stacked axially to form the containment structure;

wherein the metallic rings comprise iron or an iron alloy;

wherein the containment structure incorporates a hollow center cavity, the hollow center cavity encompassing a nuclear reactor vessel;

wherein the containment structure further comprises a plurality of hollow chambers within an annulus of the containment structure, the plurality of hollow chambers encompassing a plurality of auxiliary equipment;

wherein an interface is created between each of the plurality of metallic rings, each interface comprising one or more of a gasket, o-ring, structural adhesive, welding, or brazing configured to render the containment structure airtight or leak tight;

a plurality of sections, wherein the plurality of sections are stacked axially to comprise the nuclear containment structure;

a plurality of cavities within the nuclear containment structure, wherein the plurality of cavities comprise a central chamber and a plurality of auxiliary chambers;

a nuclear reactor vessel, wherein the nuclear reactor vessel is enclosed within the central chamber, the central chamber providing structure for the nuclear reactor vessel, the nuclear containment structure shielding the nuclear reactor vessel from kinetic events external to the nuclear containment structure and shielding the external environment from kinetic events within the nuclear reactor vessel;

a plurality of auxiliary components, wherein the plurality of auxiliary components are enclosed within the plurality of auxiliary chambers, the auxiliary chambers providing structure for the plurality of auxiliary components, the nuclear containment structure shielding the auxiliary equipment from kinetic events external to the nuclear containment structure and shielding the external environment from kinetic events within the auxiliary equipment;

wherein the nuclear containment structure comprises at least 50% iron by weight;

wherein the nuclear containment structure comprises an iron-oxide material for the capture of radioactive isotopes of iodine created by the nuclear reactor;

wherein the nuclear containment structure further comprises a boron alloy and is configured to attenuate neutron radiation;

wherein the central chamber comprises a boron steel liner;

wherein a second plurality of cavities formed in the nuclear containment structure comprises lead and is configured to increase the nuclear containment structure's ability to attenuate gamma radiation;

wherein a second plurality of cavities formed in the nuclear containment structure comprises cooling passages;

wherein the cooling channels utilize a lead-bismuth eutectic, water, heavy water, oil, glycol, dielectric fluid, sodium, sodium alloys, fluoride-salt mixtures, or lead based coolant;

wherein a second plurality of chambers formed in the nuclear containment structure accept axial tendons for supporting the structure of the vessel;

wherein a first set of the plurality of sections comprise fins configured to increase the exterior surface area of the sections;

wherein the first set of the plurality of sections are configured to be passively cooled via exposure to the surrounding atmosphere;

a plurality of sections, wherein the plurality of sections are stacked axially to comprise a vessel;

shielding, by varying the alloy properties throughout the containment structure, an exterior of the containment structure from radiation produced inside of the containment structure;

regulating, by transferring thermal energy, a temperature within the containment structure, wherein the containment structure transmits heat from an inside wall of the containment structure to an external wall of the containment structure, wherein the external wall is shaped such that an exterior surface area of a portion of the external wall exposed to air is increased compared to an exterior surface area of a portion of the external wall not exposed to air; and regulating, by storing thermal energy, the temperature within the containment structure, wherein the containment structure absorbs heat produced inside of the containment structure, wherein the containment structure comprises one or more materials having different phase change temperatures, wherein one or more of the materials is configured to undergo a phase change to absorb heat.

Unless otherwise defined, all technical and scientific terms used herein have the same meaning as commonly understood by one of ordinary skill in the art. The materials, methods, and examples provided herein are illustrative only and not intended to be limiting.

It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A nuclear containment system including a nuclear reactor vessel, the nuclear containment system comprising:
   a plurality of metallic rings, each of the metallic rings comprising an inner wall and an outer wall, wherein the plurality of metallic rings are stacked axially to comprise a nuclear containment structure;
   a central chamber within the nuclear containment structure, wherein the central chamber comprises a volume enclosed by the inner wall of each of the plurality of metallic rings;
   the central chamber configured to enclose the nuclear reactor vessel, wherein the inner wall of one or more of the plurality of metallic rings are configured to be flush against the nuclear reactor vessel;
   a plurality of auxiliary chambers within the nuclear containment structure, wherein the plurality of auxiliary chambers comprise a first set of cylindrical voids between the inner wall and the outer wall of one or more of the plurality of metallic rings, wherein one or more of the plurality of auxiliary chambers includes a pressurizer or heat exchanger, and
   a plurality of cooling channels containing a liquid coolant within the nuclear containment structure, the cooling channels comprising a second set of cylindrical voids between the inner wall and the outer wall of one or more of the plurality of metallic rings, wherein the cooling channels are configured to direct the liquid coolant throughout the nuclear containment structure,
   wherein the nuclear containment structure is configured to shield the nuclear reactor vessel from kinetic events originating externally from the nuclear containment structure and to shield an external environment from kinetic events within the nuclear reactor vessel.

2. The nuclear containment system of claim 1, wherein each of the plurality of metallic rings comprises at least 50% iron by weight.

3. The nuclear containment system of claim 1, wherein each of the plurality of metallic rings comprises an iron-oxide material for the capture of radioactive isotopes of iodine created by a nuclear reaction within the nuclear reactor vessel.

4. The nuclear containment system of claim 1, wherein one or more of the plurality of metallic rings comprises a boron alloy and is configured to attenuate neutron radiation.

5. The nuclear containment system of claim 1, wherein one or more of the plurality of auxiliary chambers is configured to accept one or more axial tendons for securing the plurality of metallic rings comprising the containment structure.

6. The nuclear containment system of claim 1, wherein the nuclear containment structure is affixed within a steel structure that provides attachment points for hoisting and rigging during the manufacturing, construction, or transportation of the nuclear containment structure.

7. The nuclear generating station of claim 1, wherein the second set of cylindrical voids comprises voids radially spaced from each other between the inner wall and the outer wall of one or more of the plurality of metallic rings.

8. The nuclear containment system of claim 1, wherein the liquid coolant is cooled via an air-to-liquid heat exchanger.

9. The nuclear containment system of claim 1, wherein the liquid coolant directs waste heat to the outside environment.

10. The nuclear containment system of claim 1, wherein interfaces exist between each of the plurality of metallic rings, each of the interfaces comprising one or more gaskets, o-rings, adhesives, or sealants.

11. The nuclear containment system of claim 10, wherein the one or more gaskets, o-rings, adhesives, or sealants mitigate the movement of radionuclides from within the central chamber or one or more of the plurality of auxiliary chambers to the external environment.

12. The nuclear containment system of claim 1, wherein interfaces exist between each of the plurality of metallic rings, each of the interfaces being sealed via welding or brazing.

13. The nuclear containment system of claim 12, wherein the welding or brazing mitigates the movement of radionuclides from within the central chamber or one or more of the plurality of auxiliary chambers to the external environment.

14. The nuclear containment system of claim 1, wherein the nuclear containment structure is capped with a metallic disk comprising at least 50% iron by weight.

15. The nuclear containment system of claim 14, wherein the metallic disk comprises a plurality of cylindrical voids configured to accept a plurality of axial tendons.

16. The nuclear containment system of claim 15, wherein the metallic disk is a first metallic disk, further comprising a second metallic disk positioned at a base of the nuclear containment structure, the second metallic disk comprising at least 50% iron by weight and being configured to support the nuclear containment structure.

17. The nuclear containment system of claim 15, wherein the metallic disk is a first metallic disk, further comprising a second metallic disk positioned at a base of the nuclear containment structure, the second metallic disk comprising a ceramic material and being configured to support the nuclear containment structure.

18. The nuclear containment system of claim 17, wherein the ceramic material is configured to prevent a molten core from escaping through the base of the nuclear containment structure.

19. A nuclear containment system including a nuclear reactor vessel, the nuclear containment system comprising:
 a plurality of metallic rings, each of the metallic rings comprising an inner wall and an outer wall, wherein the plurality of metallic rings are stacked axially to comprise a nuclear containment structure;
 a central chamber within the nuclear containment structure, wherein the central chamber comprises a volume enclosed by the inner wall of each of the plurality of metallic rings;
 the central chamber configured to enclose the nuclear reactor vessel, wherein the inner wall of one or more of the plurality of metallic rings is configured to be flush against the nuclear reactor vessel;
 a plurality of auxiliary chambers within the nuclear containment structure, wherein the plurality of auxiliary chambers comprise a first set of cylindrical voids between the inner wall and the outer wall of one or more of the plurality of metallic rings, wherein one or more of the plurality of auxiliary chambers contains a lead or a lead-alloy compound for increasing the nuclear containment structure's ability to attenuate gamma radiation; and
 a plurality of cooling channels containing a liquid coolant within the nuclear containment structure, the cooling channels comprising a second set of cylindrical voids between the inner wall and the outer wall of one or more of the plurality of metallic rings, wherein the cooling channels are configured to direct the liquid coolant throughout the nuclear containment structure,
 wherein the nuclear containment structure is configured to shield the nuclear reactor vessel from kinetic events originating externally from the nuclear containment structure and to shield an external environment from kinetic events within the nuclear reactor vessel.

* * * * *